(12) United States Patent
Oberg et al.

(10) Patent No.: US 7,821,889 B1
(45) Date of Patent: Oct. 26, 2010

(54) OFFSET LOOP FOR WOBBLE

(75) Inventors: Mats Oberg, Cupertino, CA (US); Jingfeng Liu, Longmont, CO (US)

(73) Assignee: Marvell International Ltd., Hamilton (BM)

( * ) Notice: Subject to any disclaimer, the term of this patent is extended or adjusted under 35 U.S.C. 154(b) by 638 days.

(21) Appl. No.: 11/746,371

(22) Filed: May 9, 2007

Related U.S. Application Data (60) Provisional application No. 60/799,586, filed on May 11, 2006.

(51) Int. Cl.
*G11B 20/10* (2006.01)

(52) U.S. Cl. ............. 369/47.27; 369/44.29; 369/124.11

(58) Field of Classification Search ............... 369/44.11, 369/44.26, 44.32, 47.36, 47.38, 47.44, 47.45, 369/53.43, 44.29, 44.35, 44.27, 124.11–124.12
See application file for complete search history.

(56) References Cited

U.S. PATENT DOCUMENTS

| | | | |
|---|---|---|---|
| 5,610,487 A * | 3/1997 | Hutsell | ........................ 318/560 |
| 5,933,410 A | 8/1999 | Nakane et al. | |
| 7,092,329 B2 | 8/2006 | Ko et al. | |
| 7,092,330 B2 | 8/2006 | Miyamoto et al. | |
| 7,095,681 B2 | 8/2006 | Park et al. | |
| 2004/0252608 A1 * | 12/2004 | Park et al. | ................. 369/47.27 |
| 2005/0094515 A1 * | 5/2005 | Nagai et al. | ............... 369/47.27 |
| 2006/0203631 A1 * | 9/2006 | Wu et al. | ................... 369/44.26 |
| 2007/0025222 A1 * | 2/2007 | Immink et al. | ............. 369/59.2 |

* cited by examiner

*Primary Examiner*—Wayne R Young
*Assistant Examiner*—Brenda Bernardi (57) ABSTRACT

An automated capability is provided in which an offset correction is automatically determined and routinely updated in order to reduce or otherwise eliminate data retrieval errors that may be caused by low level distortion in optical disc data storage recording, re-recording and retrieval system. The capability is implemented through an improved offset control loop for reading information from a modulated wobble signal with which the data is recorded to an optical disc data storage medium to provide detection of an offset and correction of that offset to facilitate implementation of precise timing synchronization and/or encoded information contact in the system. The offset detector measures a wobble signal and mathematically converts detected information regarding the measured wobble signal to an offset correction by integrating the wobble signal over a specific time interval and comparing the integrated value to an expected integrated value. The integration may be performed over at least one period of the sinusoidal wobble signal, and the correction added to the wobble signal.

52 Claims, 7 Drawing Sheets

OFFSET LOOP FOR WOBBLE

This application claims the priority of U.S. Provisional Patent Application No. 60/799,586, "OFFSET LOOP FOR WOBBLE," filed on May 11, 2006. The disclosure of the prior application is hereby incorporated by reference herein in its entirety.

BACKGROUND

The systems and methods according to this disclosure are directed to reducing data recovery errors including low frequency distortions that can degrade the quality of timing loop information and/or detection of address information in digital data recording systems, particularly those in which data is recorded on recordable or re-recordable optical disc data storage media.

With a need to provide removable non-volatile data storage media on which increasing amounts of data can be recorded and/or re-recorded, optical disc data storage media have proven both comprehensive and flexible enough to support expanding data storage requirements. Optical disc data storage relates to placing data on a recordable, re-recordable and/or readable surface of an optical disc. In general, to record data on, or recover data previously recorded on, an optical disc, a light beam is used to scan the surface of the optical disc using systems specifically designed for such data recovery. Currently-available recordable or re-recordable optical disc data storage media include: CD-R (Compact Disc-Recordable), DVD-R (Digital Video Disc-Recordable), DVD-RW (DVD-Rewritable), DVD+R (Writable Optical Disc), DVD+RW (Rewritable Optical Disc), DVD-RAM (DVD-Random Access Memory), and new technology higher density recordable or re-recordable optical data storage discs known as BD technology, such as HD-DVD (High Density DVD or High Definition DVD) and Blu-ray Discs.

Differing methodologies are, therefore, required by which, when data is recorded or re-recorded to such optical disc data storage media, a timing synchronization signal is provided, monitored and adjusted in order that the readback, or data retrieval, system is cued to retrieve the discretely recorded or re-recorded data from a discrete portion of the disc at the precise speed with which the data was recorded.

Figure 1:
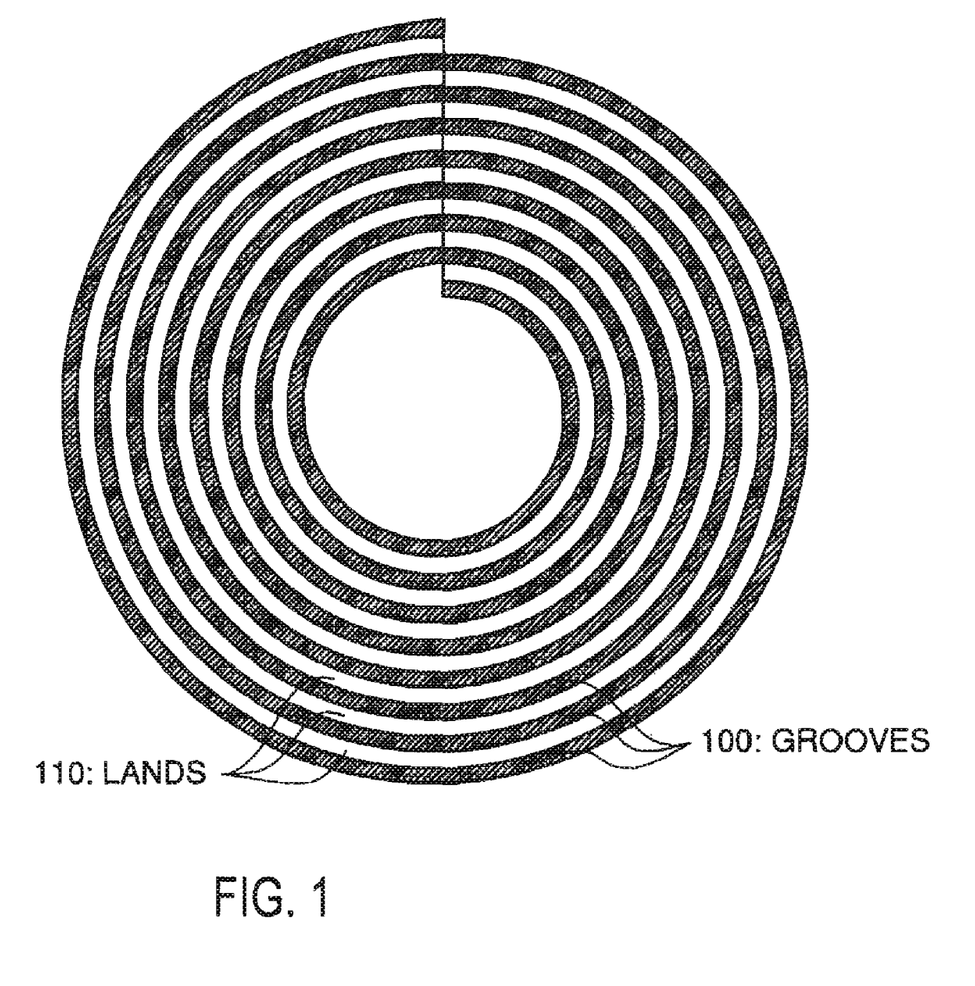
FIG. 1 schematically illustrates, in magnified detail, an exemplary embodiment of an optical disc data storage medium for land-groove recording.

A conventional optical disc formatted for land-groove recording is shown in exemplary embodiment in FIG. 1. Digital data is stored on such optical discs in the form of arrangements of data marks in spiral tracks. As shown in FIG. 1, grooves 100 and lands 110 are formed by means of a guide channel cut into the surface of a disc substrate. A recording layer (not identified) is then formed over the entire disc surface including the surfaces of the grooves 100 and the lands 110. The grooves 100 and the lands 110 each form continuous recording tracks on the disc. Data recording and reproducing are accomplished with such an optical disc storage medium by scanning the groove recording track or the land recording track with a focused light beam spot of an optical disc drive device, as shown in, and described in connection with, FIGS. 2 and 3 below. It should be noted that, in some formats, data is recorded both on lands and grooves.

Figure 2:
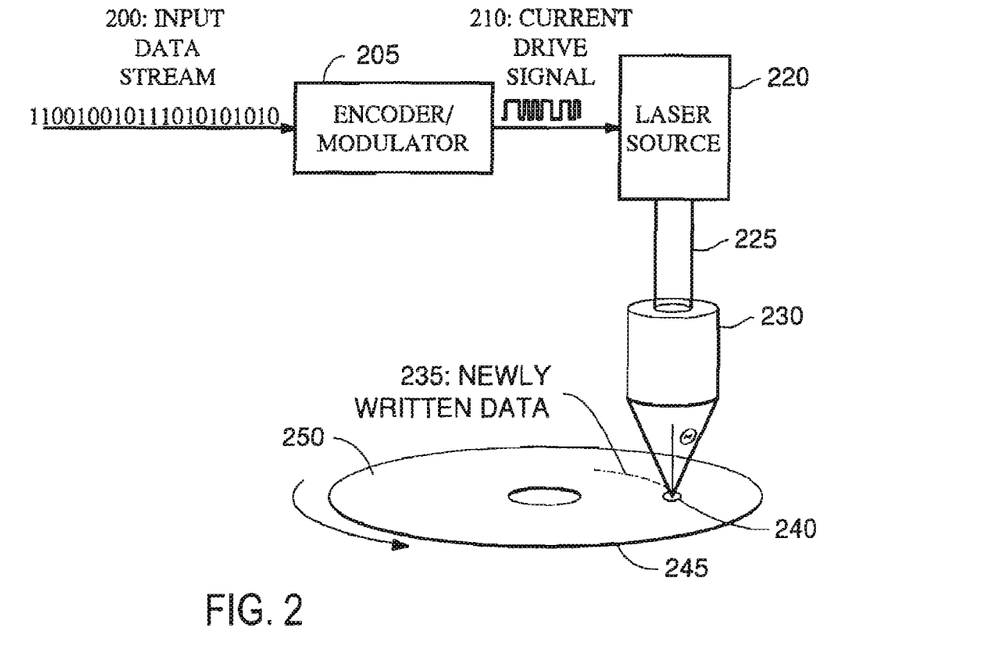
FIG. 2 illustrates an exemplary embodiment of a conventional apparatus for implementing a process to write data to an optical disc data storage medium.

FIG. 2 illustrates an exemplary conventional apparatus for implementing a process to write data to an optical disc data storage medium. As shown in FIG. 2, an input stream of digital information 200 is converted using an encoding/modulating unit (encoder/modulator) 205 into a drive signal 210 for a light source such as a laser source 220. The laser source 220 emits a light beam 225 that is directed toward, and focused onto, a recording surface 250 of an optical disc data storage medium 245. The focusing of the light beam 225 typically involves an illumination optics unit 230 to produce a very precise scanning spot 240. The diameter of the scanning spot 240 precisely coincides with the width of the groove and/or the land in the optical disc data storage medium 245. In order to accommodate more information on a single optical disc data storage medium, the lands and the grooves are made individually thinner in a radial direction requiring that the illumination optics unit 230 ever-more-precisely focus the scanning spot 240, thereby reducing the diameter of the scanning spot 240. As the surface 250 of optical disc data storage medium 245 is rotated under the scanning spot 240, energy from the scanning spot 240 is absorbed by a surface treatment on the surface 250 of the optical disc data storage medium 245 through heating of a small, localized region of the surface 250. The reflective properties of the surface 250 of the optical disc data storage medium 245 are thus locally discretely altered in accordance with, and to reflect recording of, the input data stream 200. Modulation of the light beam 225 is synchronous with the drive signal 210, so a circular track of data marks is formed as newly written data 235 as the surface 250 rotates.

Figure 3:
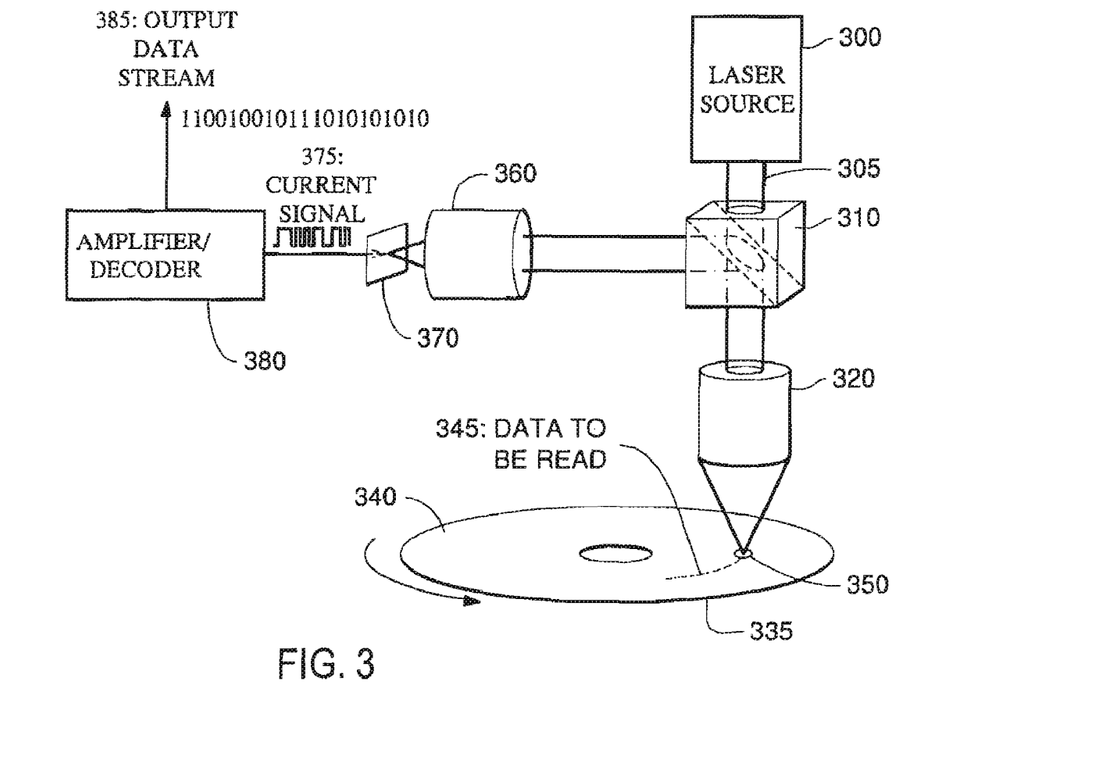
FIG. 3 illustrates an exemplary embodiment of a conventional apparatus for implementing a process to read data from an optical disc data storage medium.

FIG. 3 illustrates an exemplary conventional apparatus for implementing a process to read data from an optical disc data storage medium. As shown in FIG. 3, a light beam 305 from a light source such as a laser source 300 (which may be the same as the writing laser source 220 shown in FIG. 2) is directed through a beam splitter device 310 into an illumination optics unit 320 (which may be the same as illumination optics unit 230 shown in FIG. 2) to focus the light beam 305 onto a surface 340 of the recorded optical disc data storage medium 335. As previously-recorded data marks to be read 345 pass under a scanning spot 350, light is reflected toward the illumination optics unit 320. Reflected light is collected by the illumination optics unit 320 and directed by the beam splitter 310 toward a collector of a data optics unit 360. The data optics unit 360 converges the reflected light onto one or more detectors in a light detector array 370. Detectors in the detector array 370 convert the reflected light into a current modulated signal 375. This collected current modulated signal 375 is amplified and/or decoded in an amplifier/decoder unit 380 to produce an output data stream 385 that corresponds to the previously-recorded data marks to be read 345 from the surface 340 of the optical disc data storage medium 335.

In data storage applications, inclusion of synchronizing marks, also referred to as timing information marks, and physical location information, are essential for recording data at a certain location on the optical disc data storage medium to facilitate, among other capabilities, finding the data location at a later time. A sector number, sector type and a land track/groove track can be recognized from the address information. In other words, the address information provides information for finding a specified sector to record/reproduce data to/from a certain location in an optical disc data storage medium.

When data is stored randomly on an optical disc data storage medium, various methods are included in the recording process to encode address and timing synchronization information. One method includes recording such information on, for example, a non-data area or non-recording area of the optical disc data storage medium by forming embossed pits separately from data recording sectors. These pits are pre-formed and then during the recording process recorded with non-data information to facilitate data identification and location, and timing synchronization for readback. A drawback to this method, however, is that these pre-pitted areas reduce the effective recording area of the optical disc data storage medium. Another method employed, particularly for higher density recording applications, is referred to as "wobbling" in which the lands and grooves of an optical disc data storage medium are pre-wobbled, in a radial direction, at a specific frequency.

Figure 4:
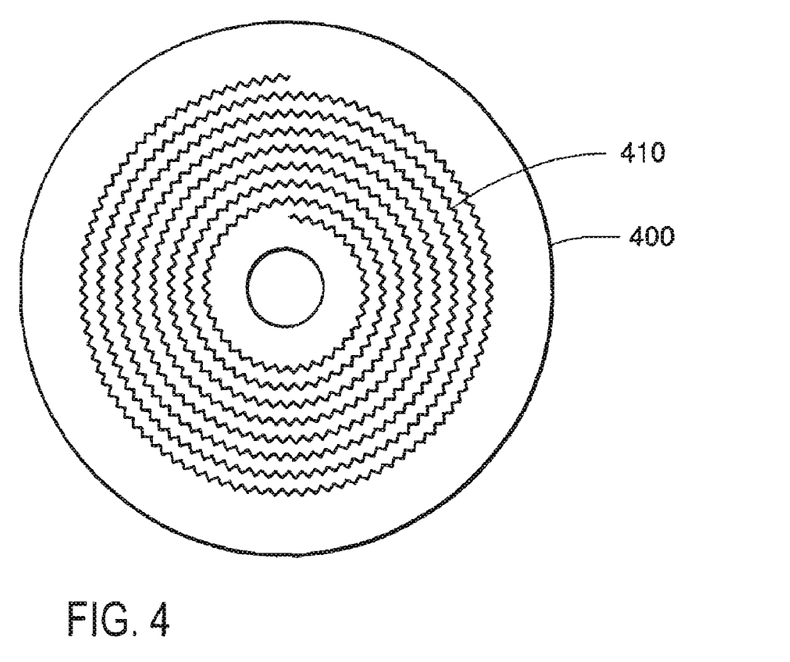
FIG. 4 illustrates an exemplary embodiment of an optical disc data storage medium with a radially sinusoidal predetermined wobble physically introduced into the lands and/or grooves of the optical disc data storage medium.

FIG. 4 illustrates an exemplary embodiment of a conventional optical disc data storage medium 400 into which a predetermined reference wobble 410 is physically encoded, i.e., the grooves (and/or lands) of the recordable surface of the optical disc data storage medium are physically pre-wobbled at a given frequency. As shown in FIG. 4, a sinusoidal wave with an amplitude in a radial direction is physically introduced into the grooves. When data is recorded, frequency or phase modulation is then performed around this reference wobble. The address information is encoded in a modulated wobble signal, and introduced, for example, with a measurable, modulated signal offset when the data is recorded to the optical disc data storage medium 400. During readback of, and/or other recovery of data from, the optical disc data storage medium, an address of the pre-recorded data may be identified by demodulating the recorded wobble signal from the reference wobble. Timing synchronization information for, for example, controlling rotation speed of the optical disc data storage medium precisely to facilitate clear readback or data recovery may be implemented by demodulating a modulated wobble signal in comparison to a wobble reference signal. Precise timing synchronization for readback and/or other data recovery is implemented through use of a timing loop such as, for example, a phase-locked loop to control a readback speed of data from a sector of the optical disc data storage medium in response to the demodulated recorded wobble signal.

Errors in detecting and properly employing a wobble signal may be introduced by, for example, presence of low frequency distortion and/or a DC-offset component in the wobble signal.

SUMMARY

Several conventional methods are employed to implement such a timing loop for speed control in such digital data recording and reproducing systems, particularly those which read data to and read data from optical disc data storage media. The objective in such control is to record or eliminate the likelihood of data retrieval errors. In precisely implementing timing control and/or detecting the wobble address signal, it would be advantageous to find a simple methodology to reduce or otherwise eliminate low frequency distortion that may be caused by errors in precisely filtering information readback from the optical disc data storage medium. Typically some form of offset loop feedback mechanism is employed to provide an offset correction signal to detect and correct for such low level distortions during readback of information pre-recorded on the optical disc data storage medium.

A simplified capability whereby an offset correction may be automatically determined and routinely updated in order to reduce or otherwise eliminate low level distortion in optical disc data storage recording, re-recording and retrieval systems is disclosed.

The systems and methods according to this disclosure may provide an improved offset timing loop for reading information from associated modulated wobble signals with which data is recorded to an optical disc data storage medium to provide detection of an offset error and correction for that offset error to facilitate precise implementation of timing control and/or detecting the wobble address signed via the improved offset control loop.

The systems and methods according to this disclosure may provide a novel offset detector for measuring a DC-offset and mathematically converting information regarding the measured offset to an offset correction to reduce or otherwise eliminate data retrieval errors particularly those that may be associated with low level distortion.

The systems and methods according to this disclosure may rely on the basic sinusoidal nature of a wobble signal by integrating the wobble over one complete period (T) of the sinusoidal signal and comparing the actual integrated value to an expected integrated value, generally zero in the absence of any predetermined offset, to determine the detected offset, and to introduce offset correction through, for example, an offset control unit, in some form of timing feedback loop.

In various exemplary embodiments, the systems and methods according to this disclosure may provide varying capabilities whereby certain recording or disc formats, in which deviations from zero occur in individual wobble periods due to, for example, types of frequency modulation used, to integrate the wobble signal over a plurality of periods and compare the integrated signal value for the plurality of periods to an expected value of zero, thereby generating an offset signal.

In various exemplary embodiments, the integrated result may be compared, as necessary, to a wobble signal which may contain a specific preset DC-offset and correction may be introduced to the preset DC-offset.

The proposed integration scheme may incorporate a time period different from a single wobble period, as a timing window. Wobble signal information measured with, and integrated within, such a timing window may be combined with such information measured and integrated for a plurality of successive timing windows where the duration of the timing windows is constant but is other than a complete wobble signal period, in order to detect the offset and generate a correction for the detected offset.

In various exemplary embodiments, an integration scheme may begin and end in any phase of a wobble period as long as the integration time spans one or more complete wobble periods, or one or more complete timing windows.

The proposed integration scheme may be performed over phased shift boundaries. It should be recognized that such integration may result, in the absence of a DC-offset, in temporarily providing a non-zero mean error to the signals. If the integration is, however, performed over multiple phase shift boundaries, the non-zero means of the error signal would cancel each other out because a next phase transition boundary may yield an error signal mean of approximately the same amplitude but with an opposite sign from the previous phase shift boundary. Such a result would also ensue for integrated results from a number of successive timing windows in which the duration of the timing window is other than a full wobble period as described above.

In various exemplary embodiments the systems and methods according to this disclosure may aggregate and/or average the integrated results from a plurality of wobble periods. This aggregated and/or average signal correction, may then be introduced into the offset timing loop only upon actuation of a specific actuating signal to the system, hereinafter referred to as a "dump signal."

These and other objects, advantages and features of the disclosed exemplary systems and methods are described in, or apparent from, the following description of embodiments.

BRIEF DESCRIPTION OF THE DRAWINGS

Exemplary embodiments will be described, in detail, with reference to the accompanying drawings, where like numerals represent like parts, and in which.

DETAILED DESCRIPTION OF EMBODIMENTS

The following description of various exemplary embodiments of systems and methods for implementing an improved offset loop for detecting an offset by referencing a wobble signal according to this disclosure may refer to optical disc data storage media and systems and methods for recording data on, and retrieving data from, such media for clarity and ease of understanding. All references to such systems and media, such as those shown in exemplary manner in FIGS. 1-4, are intended to be illustrative of environments to which systems and methods according to this disclosure may be adapted. The systems and methods according to this disclosure should not be construed, however, as being limited to such applications, or to any specific system that may be considered limited by the elements shown in the figures. An offset detector according to the systems and methods of this disclosure may find applicability in any system in which a typically sinusoidal wave may be used for, for example, timing synchronization and/or any manner of identification of information, and where precise timing synchronization may prove beneficial in reducing or otherwise eliminating errors in the functioning of such system by introducing a correction factor based on integration of the available sinusoidal information within the system.

The systems and methods according to this disclosure provide a capability to extract information from recording tracks of a recordable and/or re-recordable optical disc data storage medium that are wobbled to assist, for example, with timing synchronization during recording, and/or to give address information, and to detect an offset correction which can be input as an offset control to facilitate timing synchronization and other benefits during playback. Such timing synchronization and other benefits are designed to reduce and/or eliminate errors in data recovery from sources such as, for example, low frequency distortions in radial push-pull (RPP) signals within such systems.

Figure 6:
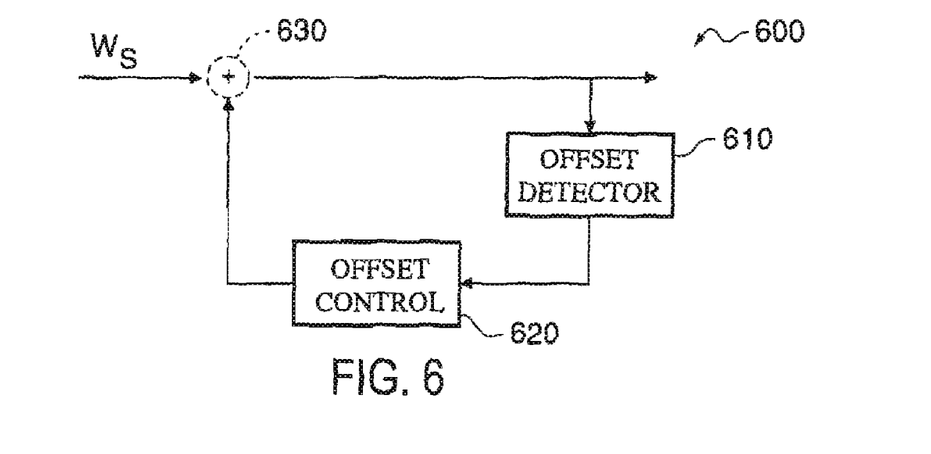
FIG. 6 schematically illustrates a first embodiment of an offset control loop that may employ an offset detector according to this disclosure.
Figure 7:
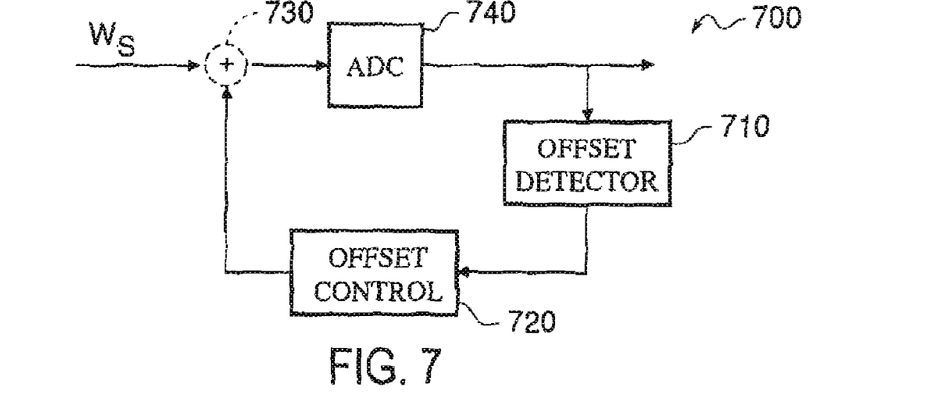
FIG. 7 schematically illustrates a second embodiment of an offset control loop that may employ an offset detector according to this disclosure.

Exemplary offset control loops are shown, for example, in FIGS. 6 and 7 and may be provided in a system for recording data to, and/or reading data from, an optical disc data storage medium to reduce data recording or reproducing errors in data recording and reproducing systems. As discussed briefly above, the recording track of an optical disc data storage medium is wobbled as a sinusoid such that RPP signals form a basically sinusoidal waveform during data recovery, playback and/or readback. Because low frequency distortions can degrade the ability to implement, or otherwise degrade the quality of, timing synchronization information and/or detection of address information, systems and methods according to this disclosure provide improved methods for detecting low frequency distortions in the RPP signal. In various exemplary embodiments, an RPP signal may be integrated over one or more wobble periods to obtain a mean value of the signal. The mean value of the RPP signal may then be used, be calculated and fed back through an offset loop to provide offset control of a wobble signal to reduce, or even to eliminate, low frequency distortion that may be introduced into readback of data based on imprecision in system control.

According to a wobble signal method of data address and timing synchronization, a predetermined wobble is physically introduced by varying both walls of a groove in an optical disc data storage medium. This predetermined wobble may be used as an auxiliary clock signal during recording.

Although the appearance of the optical discs is typically shown as a spiral configuration similar to FIG. 1, in actuality the grooves in the discs to which the systems and methods according to this disclosure may be directed, include this predetermined wobble in the form of a radially sinusoidal wave. The wobble refers to a radially sinusoidal deviation of the groove track, as shown, for example, in FIG. 4. The groove is not a simple Archimedes Spiral, as shown in FIG. 1, rather it is "wobbled" in a sinusoidal fashion. During readback of the data stored on the optical disc data storage medium, a readback device such as that shown in conventional form in, for example, FIG. 3, just prior to, or coincident with, reading back the data stored on the disc may detect the predetermined wobble from an unrecorded sector of the optical disc data storage medium. The readback device employs this detected wobble to lock precisely onto, for example, a pre-groove track, and to then initially set the timing synchronization for readback of data from a specifically-addressed sector to which the readback device is directed.

Figure 5A:
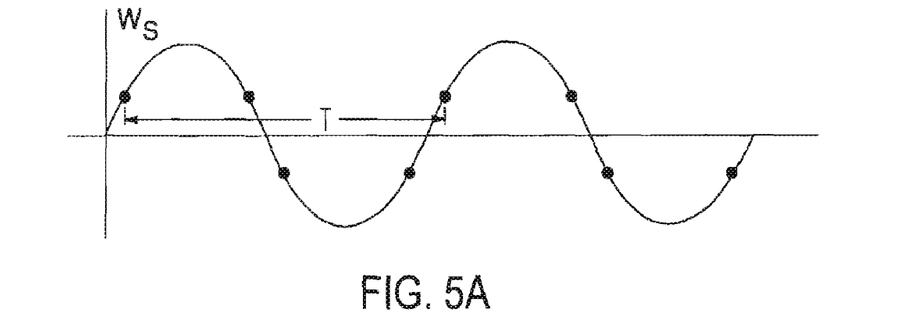
FIGS. 5A and 5B illustrate typical sinusoidal waves such as those introduced into the lands and/or grooves of the optical disc data storage medium shown in FIG. 4, and such a wave that is affected by DC-offset.

FIG. 5A illustrates a typical sinusoidal wave such as that introduced into the lands and/or the grooves of the optical disc shown in FIG. 4. Of note in FIG. 5A is that the wave is sinusoidally cyclic with a period indicated in FIG. 5A as T.

A predetermined frequency or phase modulation is introduced in the recording medium. This frequency and/or phase modulation is capable of being detected by the readback device. Differing methodologies have previously been employed to read (demodulate) this signal and to employ the demodulated signal to aid in identifying data, adjusting timing synchronization or implementing other purposes.

Figure 5B:
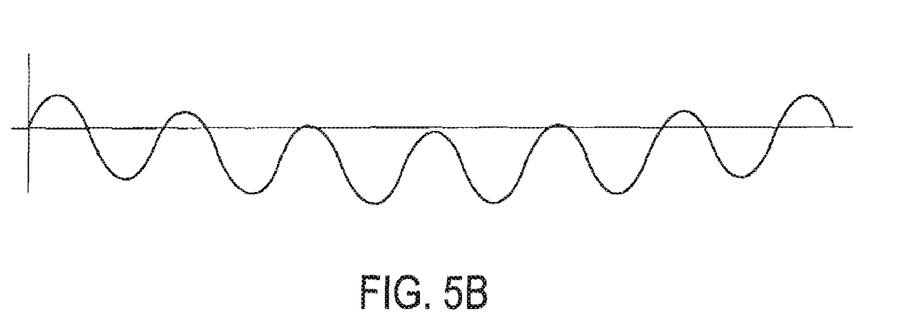

FIG. 5B illustrates a wobble signal exhibiting a low-frequency distortion (fluctuation) component and/or a DC-offset component to which the systems and methods according to this disclosure may be addressed. As shown in FIG. 5B, the wobble signal is not symmetric in amplitude about some preset level over several periods. Integrating this wobble signal, for example, over one or more periods would result in identification of a non-zero DC-offset. By subtracting such a determined DC-offset from the raw wobble signal, a corrected wobble signal may be presented to the various filters and/or phase-locked-loop circuits and systems for retrieving information from, for example, optical disc data storage media.

FIG. 6 schematically illustrates an offset control loop 600 that may employ an exemplary offset detector according to this disclosure. In general, in an offset control loop 600, the offset component is detected by an offset detector 610 through a sampling procedure of, for example, a wobble signal. On the basis of the offset component thus detected, an offset correcting signal is calculated and introduced via an offset control unit 620 to produce a signal that mediates or cancels out the detected offset component.

Figure 10:
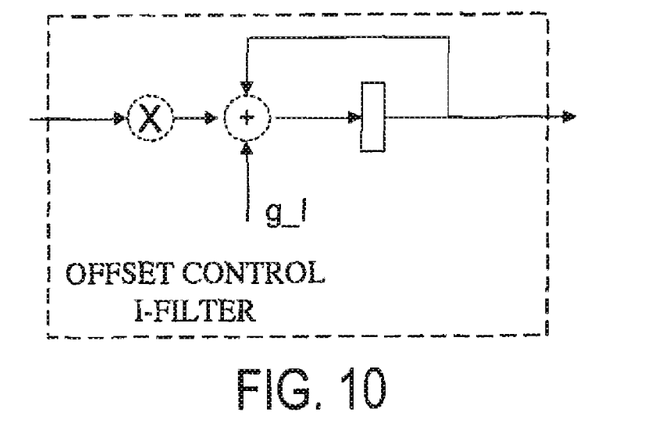
FIGS. 10 and 11 schematically illustrate first and second embodiments of filters that may be included in an offset control loop and coupled with an offset detector according to this disclosure.
Figure 11:
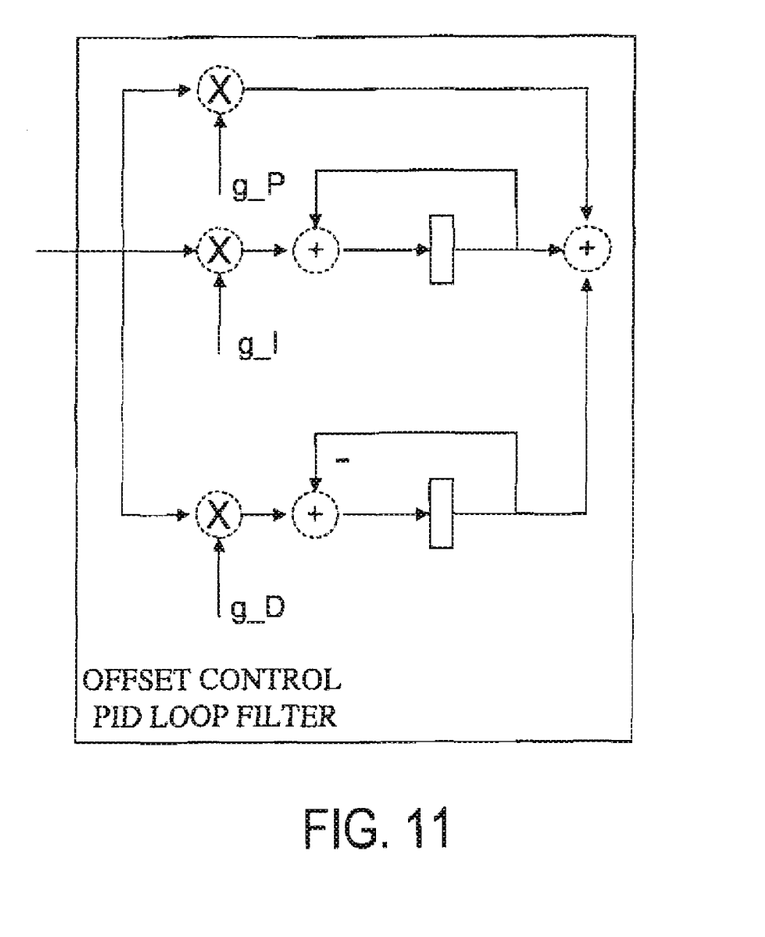

An offset correction detected by the offset detector 610 and properly converted by the offset control unit 620 may be added at an adder 630 to the input wobble signal $w_s$ and the output signal passed to the system within which the offset control loop is housed to better facilitate control of timing synchronization in the system. The output signal may be passed to the offset detector 610 generally continuously in order that a detected offset error signal is fed to the offset control unit 620 to automatically and constantly update the offset correction signal. Employing such offset correction is desirable to reduce and/or otherwise eliminate low frequency distortions that may lead to data readback errors. Offset control unit 620, such as that schematically illustrated in FIG. 6 may be but a single offset control block element for example, a low pass filter for filtering incoming error signals for low frequency components or DC component. Typical filters for performing such functions are shown in FIGS. 10 and 11. Inputs to, and outputs from offset control loops may be in a form of both analog and digital signals.

FIG. 7 schematically illustrates a second embodiment of an offset control loop 700 that may employ an offset detector according to this disclosure. In FIG. 7, an offset control loop 700 includes use of a correction in an analog domain with an offset detector in the digital domain. It should be recognized and appreciated that analog to digital conversion need not occur in the depicted portion of the circuit. Rather, differing offset control loops may deal with wobble signal information as either digital or analog data, any necessary conversion may occur at other portions in the circuit.

The offset control loop 700 illustrated in FIG. 7 includes many of the same features of the offset control loop shown in FIG. 6. These include an offset detector 710, offset control unit 720 and an adder 730. Offset control loop 700 also incorporates, however, an analog-to-digital converter (ADC) 740. With the inclusion of the ADC 740, wobble signal inputs are converted from analog to digital format for use in the offset detector 710 and offset control unit 720, and to be otherwise output to the system from the offset control loop 700.

Figure 8:
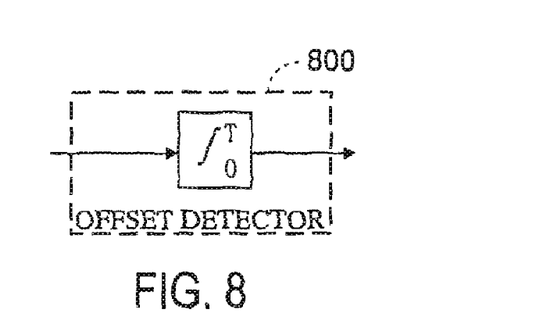
FIG. 8 schematically illustrates an offset detector according to the systems and methods of this disclosure that may be introduced into typical embodiments of offset control loops such as those illustrated in FIGS. 6, 7, and 9.
Figure 9:
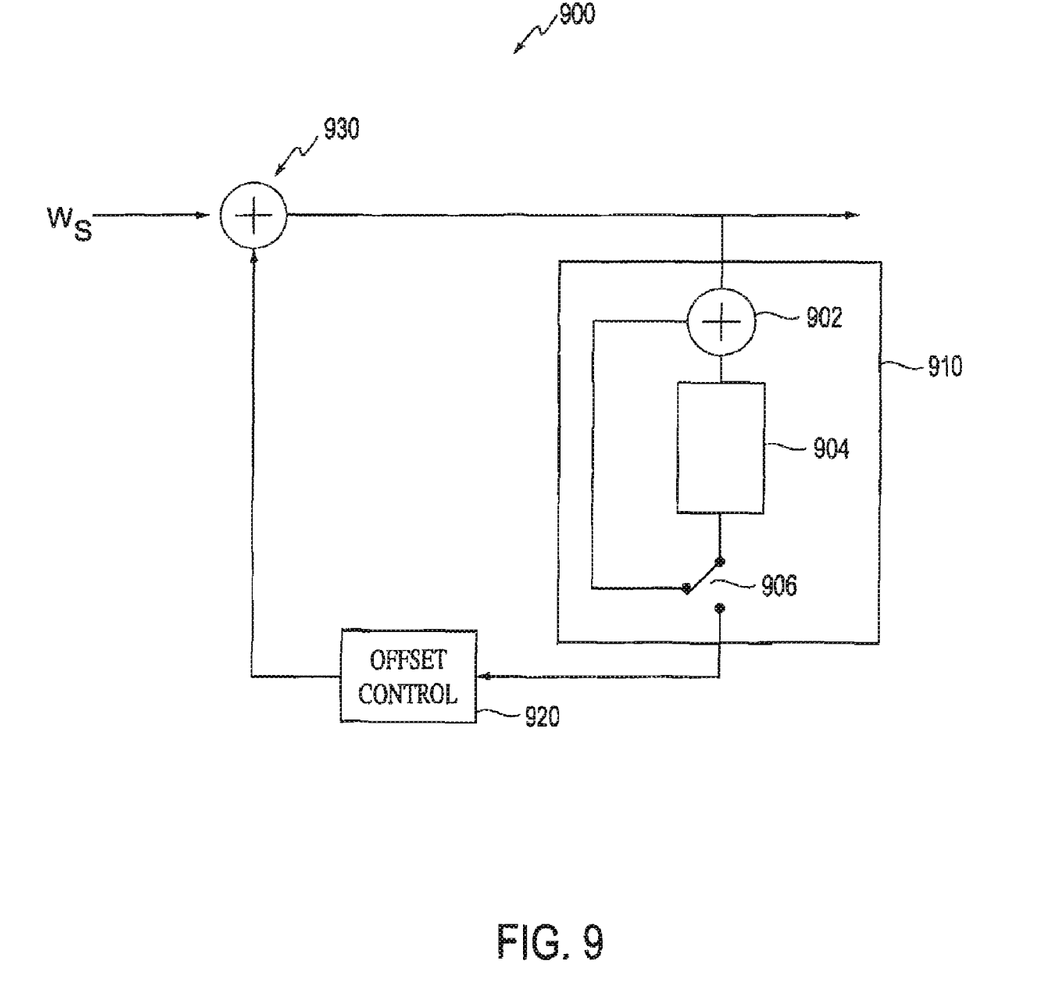
FIG. 9 schematically illustrates a third embodiment of an offset control loop including a dump signal for selectively introducing offset control to the system, which may employ an offset detector according to this disclosure.

FIG. 8 schematically illustrates an offset detector according to the systems and methods or this disclosure that may be introduced into typical embodiments of offset control loops such as those illustrated in FIGS. 6, 7 and 9. The offset detector 800 shown in FIG. 8 can be included in either of the offset control loops 600 or 700, as elements 610 or 710, as shown in FIGS. 6 and 7.

During playback and/or retrieval of information previously stored on the disc, the wobble signal, as phase or frequency shifted, or not, can be used as a timing synchronization signal. The playback apparatus retrieves the basically sinusoidal (or cosine) wave with or without phase shifts, and with or without frequency shifts.

In various exemplary embodiments, the offset detector 800 shown in FIG. 8 integrates the read wobble signal over one or more time intervals. Such time intervals may relate to a single or multiple sinusoidal wave periods (T as shown in FIG. 5A) or may otherwise include any periodic, sequential time window of a specified time interval, which may not be related to the sinusoidal period T of the wobble signal. Offset detection, as will be described in greater detail below, may be implemented by integrating the detected wobble signal over the specified time interval, i.e., one phase period T of the wobble signal, or otherwise in any timing window for sequentially integrating the wobble signal. The integration may be synchronized with the phase of the wobble signal over one or more periods of that signal. For many optical disc formats, integrating the wobble over one period may yield an expected value of zero. In such instances, any integrated result that is other than zero represents the detected offset. This detected offset may then be fed back through the offset control loop to the input wobble signal and the input wobble signal will then be corrected with this offset and output to the system within which the offset control loop is resident. Varying optical data disc storage media formats, with varying disc recording apparatus for recording information thereon, may yield deviations from zero for individual wobble periods due to types of modulation, frequency or phase modulation, employed. Over multiple wobble periods, however, the mean for such an integration operation should be zero. Again here, any non-zero integration result may represent a detected offset to be added to input wobble signal prior to output. Several other variations of this basic concept may be implemented. One such variation regards integration over wobble periods for systems which in some instances purposely generate a non-zero DC-offset. For these systems, the integration result should be equal to a predetermined DC-offset, or compared to the predetermined DC-offset in order to render a detected error.

In various exemplary embodiments, the systems and methods according to this disclosure provide an offset detector 800 that integrates the wobble signal over at least one wobble period to get an estimate of a correction signal, by using the following equation:

$$e_t = \sum_T \omega_s \qquad \text{(Equation 1)}$$

A determination may need to be made whether to synchronize the integration with the phase of the signal. For example, in cases where the data is encoded as phase shifts, the integration may be synchronized. If not, the integration may occur discretely or continuously over several cycles in order to nullify false errors that may be induced by, for example, interaction across a false boundary.

FIG. 9 illustrates a third embodiment of an offset control loop 900 including a "dump signal" for selectively introducing offset control to the system which may employ an offset detector according to this disclosure. As shown in FIG. 9, the offset control loop 900 includes an offset detector 910, an offset control unit 920 and an adder 930. In this regard, the offset control loop shown in FIG. 9 is similar to those shown in FIGS. 6 and 7. Offset detector 910 incorporates an integrator consisting of an adder 902 and a memory element 904, a signal control switch or logic signal gate 906 to control when to output the integrated signal and reset the integrator. In offset control loop 900, offset detection occurs with offset detector 910. A difference is that integration occurs, via integrator 904 and internal adder 902 within offset detector 910 based on the position of logic signal gate 906. Output from the offset detector 910 is inhibited and not allowed to pass to the offset control unit 920 until a discrete "dump" signal is generated to close logic signal gate 906 to allow offset detector information to pass to the offset control unit 920.

It should be appreciated that the wobble period, as shown in the example in FIG. 5, may be specified according to an optical disc format. By way of example, for CD-R and DVD-R(W) formats, the integration may begin and end in any phase of the wobble period, as long as the integration time spans one wobble period. Because the wobbles for these two formats are sinusoids with either constant frequency (DVD-R(W)) or frequency modulated with small delta frequency (CD-R), exemplary embodiments according to this disclosure may employ sliding interval window filters of length equal to the wobble period.

It may be preferable not to integrate the wobble signal across phase shift boundaries in such an embodiment because such integration would, in the absence of DC-offset, temporarily yield non-zero mean error signals. However, if the integration is performed over phase shift boundaries, the non-zero mean of the error signals may cancel each other because the next phase transition boundary would yield an error signal mean of opposite sign from the previous phase shift boundary. In other words, an average error over a plurality of integration periods, for example, in integration periods covering eight wobble periods for which there might be a phase shift would be zero.

FIGS. 10 and 11 schematically illustrate first and second exemplary embodiments of filters that may be included in offset control loops and coupled with offset detectors according to this disclosure. FIG. 10 illustrates an integrating loop filter. FIG. 11 illustrates a proportional, integral and differential loop filter.

It should be appreciated that, given the required inputs for detection of a wobble signal, the processing outlined above with regard to the offset detector and/or offset control unit may be implemented in a computer readable data storage medium having software recorded thereon for causing a computer to execute a correction signal generating method through software algorithms, hardware or firmware circuits, or any combination of software, hardware and/or firmware detection control and/or processing elements.

Figure 12:
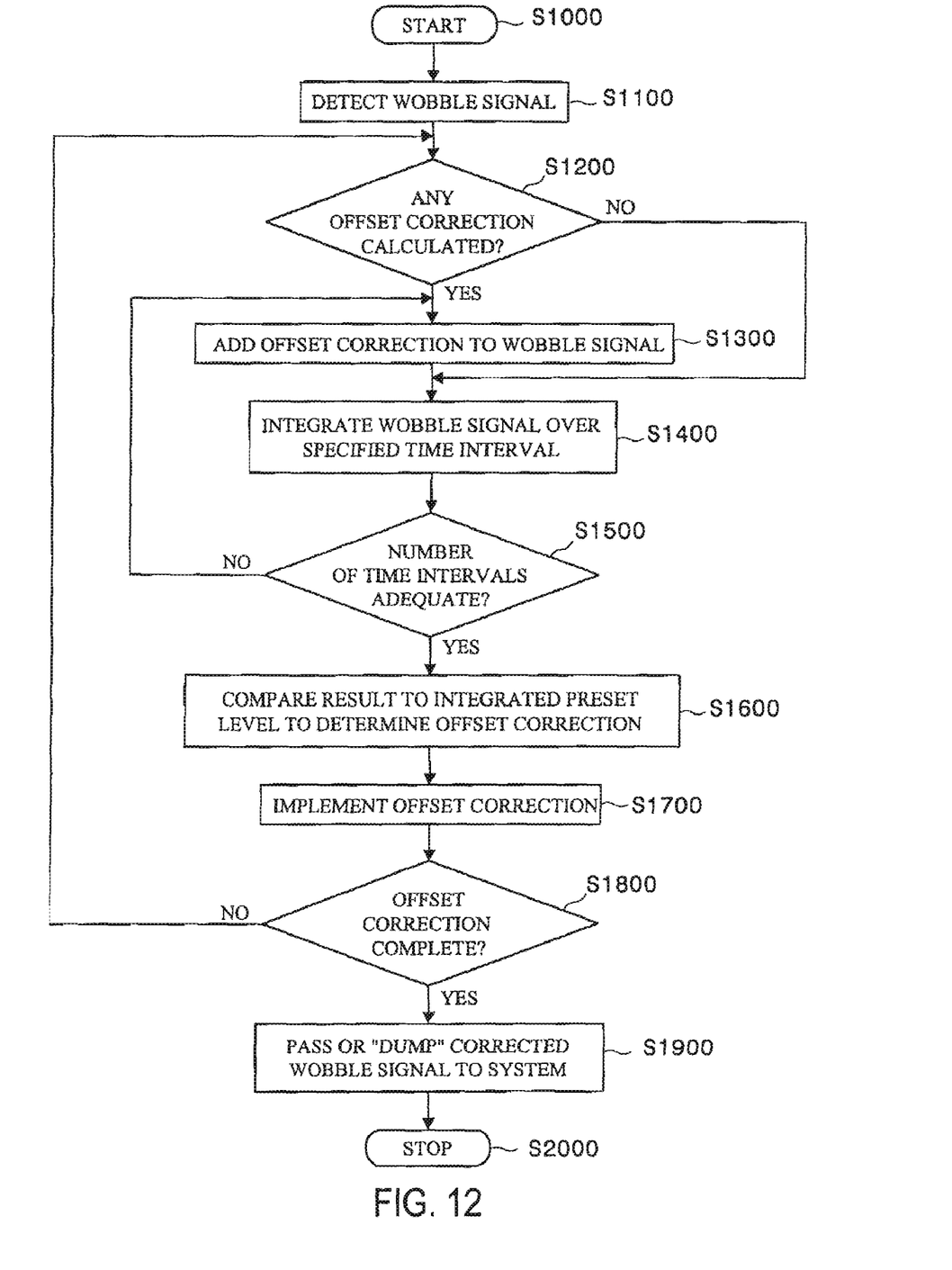
FIG. 12 is a flow diagram depicting an exemplary method for improved offset detection and timing synchronization signal error correction generation according to this disclosure.

FIG. 12 is a flow diagram depicting an exemplary method for improved offset detection and error correction using a wobble signal read from an optical disc data storage medium. As shown in FIG. 12 operation of the method begins at step S1000 and proceeds to step S1100.

In step S1100, a wobble signal is detected. Operation of the method continues to step S1200.

In step S1200, a determination is made whether any offset correction has previously been calculated. If, in step S1200, a determination is made that no offset correction has previously been calculated operation of the method continues directly to step S1400.

If, in step S1200, a determination is made that any offset correction has been calculated, operation of the method continues to step S1300.

In step S1300, any previously-calculated offset correction is added to the wobble signal. Operation of the method continues to step S1400.

In step S1400, the wobble signal is integrated over one or more specified time intervals. Thus, integration may occur discretely for a single time interval as shown in step S1400. Operation of the method optionally continues to step S1500.

In step S1500, a determination is made whether a single time interval is adequate. If, in step S1500, a determination is made that a single time interval is not adequate, operation of the method may revert to step S1300 where a first integrated value is added as an offset correction to the wobble signal and further integration occurs over additionally specified time intervals.

If, in step S500, a determination is made that a single time interval is adequate or otherwise that the number of time intervals previously sampled is now adequate, operation of the method continues to step S1600.

In step S1600, a comparison of the integrated result is made to a preset level to determine an offset correction. Operation of the method continues to step S1700.

In step S1700, an offset correction is implemented, for example, by inputting an offset correction circuit through an adder to a wobble signal to produce a corrected wobble signal. Operation of the method continues to step S1800.

In step S1800, a determination is made whether offset correction is complete. If in step S1800, a determination is made that offset correction is not complete, operation of the method may revert to either step S1200, or step S1300, and continue.

If in step S1800, a determination is made that offset correction is complete, operation of the method proceeds to step S1900.

In step S1900, corrected wobble signal data is passed to the system. Such passing may occur by an auxiliary dump signal, for example, being manually or automatically input to a signal gate to cause the corrected wobble signal to be passed to the system in a controlled manner, or may simply be automatic. Additionally, the wobble signal although indicated in this method as being corrected by a series of discrete steps, may be continuously updated as individually identified steps in the method occur virtually simultaneously. Operation of the method continues to step S2000 where operation of the method ceases.

It should be appreciated that the time intervals discussed, for example, in steps S1400 and S1500 may be a single period of a wobble signal. Other time intervals, as discussed above, however, may be implemented.

The foregoing detailed description of exemplary embodiments of systems and methods for improved control of the wobble signal using an integrating offset detector based on information provided by detecting the wobble signal in, for example, an optical disc data storage medium recording, re-recording and/or reading device is meant to be illustrative, and in no way limiting. The above detailed description of systems and methods is not intended to be exhaustive or to limit this disclosure to any precise embodiment or feature disclosed. Modifications and variations are possible in light of the above teaching. The described embodiments were chosen in order to clearly explain the principles of operation of the systems and methods according to the disclosure and their practical application to enable others skilled in the art to utilize various embodiments, potentially with various modifications, suited to a particular use contemplated.

What is claimed is:

1. A method of generating an offset correction signal, comprising:
   detecting a wobble signal from a data storage medium;
   integrating the wobble signal over a specified time interval to determine an error signal representing at least one of a low-frequency distortion component and a DC offset component in the wobble signal; and
   generating an offset correction signal based on the determined error signal.

2. The method of claim 1, wherein the specified time interval is a single complete period of the wobble signal.

3. The method of claim 2, further comprising integrating the wobble signal over at least one additional complete wobble period.

4. The method of claim 3, wherein the wobble signal is integrated over the single complete period of the wobble signal and the at least one additional complete wobble period based on a format of the data storage medium.

5. The method of claim 3, wherein the single complete wobble period and the at least one additional complete wobble period do not cross a phase shift boundary in the wobble signal.

6. The method of claim 3, wherein at least one of the single complete wobble period and the at least one additional complete wobble period cross a phase shift boundary in the wobble signal.

7. The method of claim 1, wherein the specified time interval is other than a complete period for the wobble signal and is indicated as a time window.

8. The method of claim 7, wherein the wobble signal is integrated over a plurality of time windows.

9. The method of claim 8, wherein a number of the plurality of time windows over which the wobble signal is integrated is selected based on a format of the data storage medium.

10. The method of claim 1, wherein the data storage medium is a recordable optical disc data storage medium.

11. The method of claim 1, further comprising passing the wobble signal through an analog to digital converter before integrating the wobble signal.

12. The method of claim 1, further comprising adding a previously generated offset correction signal to the wobble signal to generate an output signal.

13. The method of claim 12, wherein the output signal is integrated over another specified time interval to determine a second error signal that is in turn used to determine an offset correction signal.

14. The method of claim 12, wherein the adding is controlled in response to a dump signal.

15. The method of claim 12, further comprising outputting the output signal to a readback device to at least one of facilitate timing synchronization of readback of recorded data or eliminate the low-frequency distortion component or the DC offset component.

16. The method of claim 15, wherein the outputting is controlled in response to a dump signal.

17. The method of claim 1, wherein generating the offset correction signal comprises employing an integrating loop filter.

18. The method of claim 1, wherein generating the offset correction signal comprises employing a proportional, integral and differential loop filter.

19. A system for generating an offset correction signal, comprising:
   an offset detector that integrates a detected wobble signal over a specified time interval to determine an error signal representing at least one of a low-frequency distortion component and a DC offset component in the wobble signal; and
   an offset control that generates an offset correction signal based on the determined error signal.

20. The system of claim 19, wherein the specified time interval is a single complete period of the wobble signal.

21. The system of claim 20, wherein the wobble signal is integrated over at least one additional complete wobble period.

22. The system of claim 21, wherein the wobble signal is integrated over the single complete period of the wobble signal and the at least one additional complete wobble period based on a format of a data storage medium from which the wobble signal is detected.

23. The system of claim 21, wherein the single complete wobble period and the at least one additional complete wobble period do not cross a phase shift boundary in the detected wobble signal.

24. The system of claim 21, wherein at least one of the single complete wobble period and the at least one additional complete wobble period cross a phase shift boundary in the detected wobble signal.

25. The system of claim 19, wherein the specified time interval is other than a complete period for the wobble signal and is indicated as a time window.

26. The system of claim 25, wherein the wobble signal is integrated over a plurality of time windows.

27. The system of claim 26, wherein a number of the plurality of time windows over which the wobble signal is integrated is selected based on a format of a data storage medium from which the wobble signal is detected.

28. The system of claim 19, wherein the wobble signal is detected from a data storage medium that is a recordable optical disc data storage medium.

29. The system of claim 19, further comprising an analog to digital converter through which the wobble signal is passed before integrating the wobble signal.

30. The system of claim 19, further comprising an adder that adds the generated offset correction signal to the wobble signal to generate an output signal.

31. The system of claim 30, wherein the output signal is integrated over another specified time interval to determine a second error signal that is in turn used to determine an offset correction signal.

32. The system of claim 30, further comprising a signal generator and at least one signal gate that controls at least one of passing a generated offset correction signal to the adder or outputting the output signal except based on a signal generated from the signal generator.

33. An integrating loop filter comprising the system of claim 19.

34. A proportional, integral and differential loop filter comprising the system of claim 19.

35. A non-transitory computer readable data storage medium on which is recorded data for causing a computer to execute a method of generating an offset correction signal, comprising:
   detecting a wobble signal from a data storage medium;
   integrating the wobble signal over a specified time interval to determine an error signal representing at least one of a low-frequency distortion component or a DC offset component in the wobble signal; and generating an offset correction signal based on the determined error signal.

36. The non-transitory computer readable data storage medium of claim 35, wherein the specified time interval is defined as a single complete period of the wobble signal.

37. The non-transitory computer readable data storage medium of claim 36, wherein the integrating the wobble signal occurs over at least one additional complete wobble period.

38. The computer readable data storage medium of claim 37, wherein the integrating the wobble signal occurs over the single complete period of the wobble signal and the at least one additional complete wobble period based on a format of the data storage medium.

39. The non-transitory computer readable data storage medium of claim 37, wherein the single complete wobble period and the at least one additional complete wobble period do not cross a phase shift boundary in the wobble signal.

40. The non-transitory computer readable data storage medium of claim 37, wherein at least one of the single complete wobble period and the at least one additional complete wobble period cross a phase shift boundary in the wobble signal.

41. The non-transitory computer readable data storage medium of claim 35, wherein the specified time interval is defined as a time interval other than a complete period for the wobble signal and is indicated as a time window.

42. The non-transitory computer readable data storage medium of claim 41, wherein the integrating of the wobble signal occurs over a plurality of time windows.

43. The non-transitory computer readable data storage medium of claim 42, wherein a number of the plurality of time windows over which the wobble signal is integrated is selected based on a format of the data storage medium.

44. The non-transitory computer readable data storage medium of claim 35, further comprising converting the wobble signal from an analog signal to a digital signal before integrating the wobble signal.

45. The non-transitory computer readable data storage medium of claim 35, further comprising adding a previously generated offset correction signal to the wobble signal to generate an output signal.

46. The non-transitory computer readable data storage medium of claim 45, wherein the output signal is integrated over another specified time interval to determine a second error signal that is in turn used to determine an offset correction signal.

47. The non-transitory computer readable data storage medium of claim 45, wherein the adding is controlled in response to a separately-generated signal.

48. The non-transitory computer readable data storage medium of claim 45, further comprising outputting the output signal to a readback device to at least one of facilitate timing synchronization of readback of recorded data or eliminate the low-frequency distortion component or the DC offset component.

49. The non-transitory computer readable data storage medium of claim 48, wherein the outputting is controlled and directed in response to a separately-generated signal.

50. The method of claim 1, wherein the wobble signal is an analog wobble signal.

51. The system of claim 19, wherein the wobble signal is an analog wobble signal.

52. The non-transitory computer readable data storage medium of claim 35, wherein the wobble signal is an analog wobble signal.

* * * * *